W. H. CARRIER.
AIR WASHING AND CONDITIONING APPARATUS.
APPLICATION FILED JAN. 21, 1910.
1,138,081.
Patented May 4, 1915.
2 SHEETS—SHEET 1.
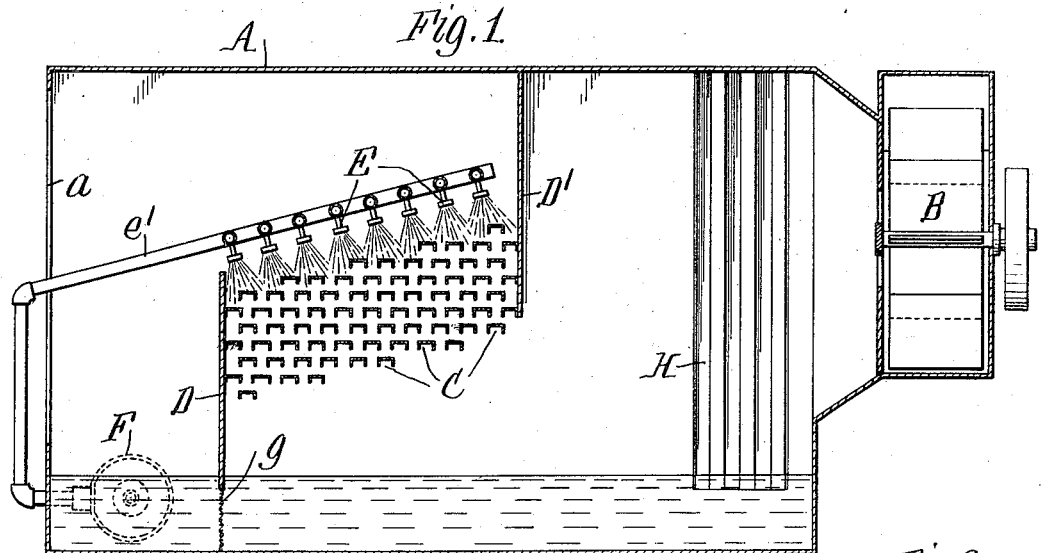
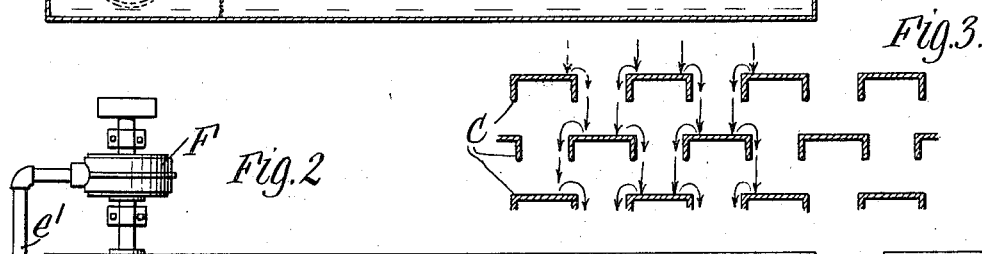
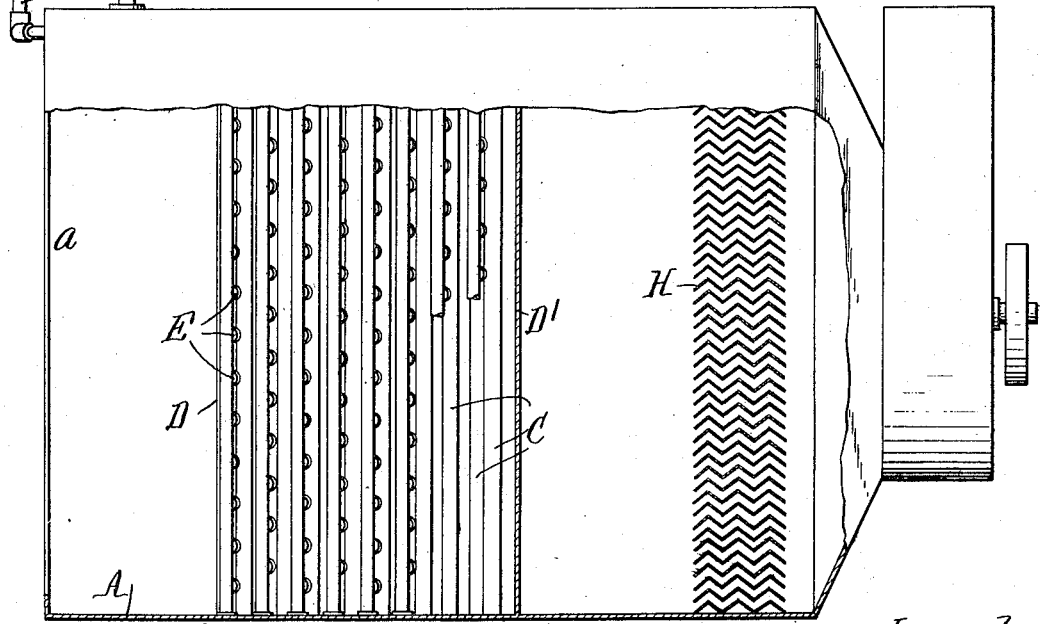
Witnesses:
E. A. Volk.
A. G. Dimond.
Inventor.
Willis H. Carrier,
by Wilhelm, Parker & Hand,
Attorneys.

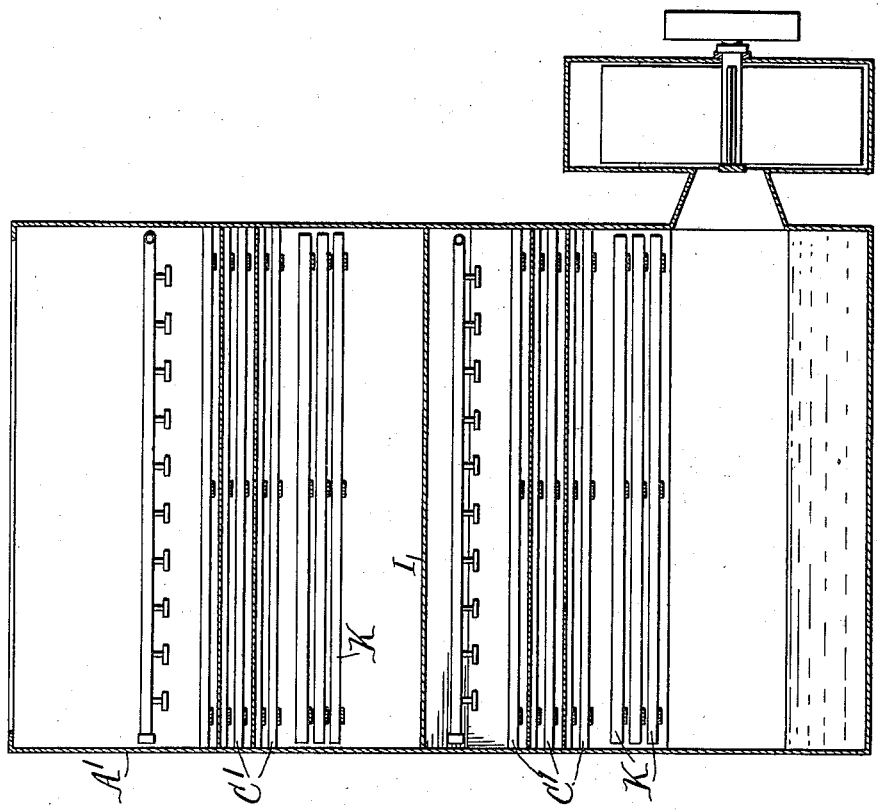
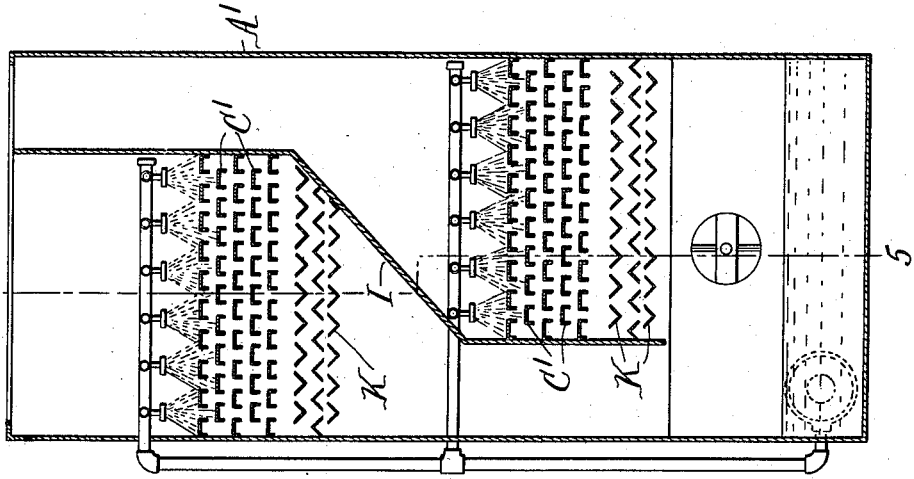

UNITED STATES PATENT OFFICE.

WILLIS H. CARRIER, OF BUFFALO, NEW YORK, ASSIGNOR TO BUFFALO FORGE COMPANY, OF BUFFALO, NEW YORK.

AIR WASHING AND CONDITIONING APPARATUS.

1,138,081. Specification of Letters Patent. Patented May 4, 1915.

Application filed January 21, 1910. Serial No. 539,411.

*To all whom it may concern:*

Be it known that I, WILLIS H. CARRIER, a citizen of the United States, residing at Buffalo, in the county of Erie and State of New York, have invented a new and useful Improvement in Air Washing and Conditioning Apparatus, of which the following is a specification.

This invention relates to air and gas washing, and conditioning apparatus of that sort in which the air or gas is caused to flow through a group of baffles or surfaces which are kept wet by water or other suitable liquid flowing over them, whereby the air or gas is brought into contact with the water so that the impurities are caught and carried off by the water.

One of the objects of the invention is to provide an efficient air and gas washing apparatus of simple, compact and inexpensive construction which will have a large capacity and be economical in operation, and in which the baffles or surfaces over which the liquid flows are so arranged as to be uniformly and thoroughly wetted and to cause a positive and forcible impingement of the air or gas against the wetted surfaces as well as the passage thereof through the liquid flowing from one to another of the baffles or surfaces, thereby causing a very intimate contact of the air or gas with the water and insuring a thorough and complete cleaning of the same. The apparatus is especially suited for purifying air and gases which are heavily laden with dust or impurities, such, for example, as the air from coal breakers. The apparatus will or will not have a humidifying and tempering action on the air or gas, depending upon the relative temperatures of the air or gas and liquid being used, and it is therefore adapted to be used for conditioning air and gases as regards their humidity and temperature as well as for cleaning them.

Another object of the invention is to so arrange the wetted surfaces or baffles as to give the maximum area of wetted surface in an apparatus of moderate dimensions without unduly increasing the resistance to the flow of the air or gas.

In the accompanying drawings, consisting of two sheets: Figure 1 is a sectional elevation of an air and gas washing or conditioning apparatus embodying the invention. Fig. 2 is a plan, partly in section, thereof. Fig. 3 is a fragmentary section, on an enlarged scale, of the washing surfaces or baffles. Fig. 4 is a sectional elevation of an apparatus of modified construction. Fig. 5 is a transverse sectional elevation thereof in line 5—5, Fig. 4.

Like reference characters refer to like parts in the several figures.

Referring first to the construction shown in Figs. 1—3, A represents a casing or chamber which is open at one end $a$ for the admission of air or gas, which is caused to pass through the casing by a blower B, or other means, preferably connecting with the opposite end of the casing.

Within the chamber or casing A is arranged a group of baffles, bars or plates C which extend substantially horizontally across the chamber or casing from side to side thereof between vertical transverse partitions or walls D D'. One of these partitions or walls D extends upwardly from the lower portion of the casing in front of the group of baffles, while the other partition or wall D', extends downwardly from the top of the casing in rear of the group of baffles so that the air or gas flowing through the casing is caused to pass in a downward direction through the group of baffles, entering the group over the front partition or wall D and leaving it beneath the rear partition or wall D'.

E represents spray nozzles arranged to discharge water or other suitable liquid in a spray on the uppermost baffles, bars or plates of the group, a sufficient number of spray nozzles being employed to thoroughly and uniformly wet the baffles, bars or plates. In the construction shown, the nozzles are arranged on horizontal pipes which extend transversely across the casing over and parallel with the baffles, bars or plates and are connected at their ends to a supply pipe $e'$. The spray water or liquid is supplied to the nozzles by a pump F which takes the water from a collecting basin or well in the bottom of the casing, into which it flows from the baffles, whereby the liquid is circulated and thus repeatedly used, but where water is used and it is not necessary to economize, the water can be supplied under suitable pressure from the service mains, or other source of supply.

The front partition depends into the water in the bottom of the casing so as to prevent the air or gas from passing under it, and a screen $g$ is preferably employed at the bottom of this partition for straining the liquid going to the pump.

The baffles preferably consist of channel bars having flat top surfaces and depending flanges, and are arranged in horizontal rows with the bars of one row staggered with relation to those in the next row, that is, with the bars of one row over or opposite to the spaces between the bars of the next row. The bars are wider than the spaces between adjacent bars in a row so that each bar, except the end bars, in one row overlaps, or has its opposite edges located vertically over the two adjacent bars in the next lower row. By reason of this relation of the bars the water flows from the opposite side edges of the bars in one horizontal row onto the tops of the bars in the next row, spreads out over the top surfaces of the latter bars and flows from the opposite sides or edges of these bars onto the tops of the bars in the next lower row, and so on to the lowermost bars, from which the water flows downwardly into the collecting basin in the bottom of the casing. The air or gas, which passes downwardly through the group of bars, is caused to impinge on the upper surfaces of the bars in each row and is then deflected laterally in opposite directions from the top surfaces of the bars in one row through the films of water flowing from the bars in the next row above, before passing downwardly through the spaces between the bars of the former row, as indicated by the arrows in Fig. 3. As the horizontal distance between adjacent bars is less than the width of a bar, and is also preferably somewhat less than the combined vertical distance between the opposite edges of each bar in one row and the two bars beneath it in the next lower row, the air or gas passes through the vertical passages between the bars with considerable velocity and is caused to impinge positively and forcibly on the wetted top surfaces of the bars in addition to passing through the films of water flowing from one row of bars to the next. The air or gas is thus broken up into many small currents and has its direction repeatedly changed in passing between and impinging upon the bars, which produces such a thorough and intimate contact of all portions of the air or gas with the water that the water removes all particles of dust or impurities from the air or gas and leaves it clean.

The baffles or bars are preferably grouped so that the rear end of the group is higher than the front end, so that the area of the air spaces between the front end of the group and the top of the casing and between the rear end of the group and the bottom of the casing will be greater than would be possible with a casing of the same dimension if the same number of bars similarly spaced were arranged with the front and rear ends of the group at the same elevation. This way of grouping the baffles or bars also insures a more even distribution of the air or gas throughout the group.

H represents an eliminator for removing the free moisture from the air or gas. The eliminator shown is of well known construction, consisting of parallel spaced upright zig-zag plates between which the air passes. This construction is preferred as it is very efficient, but any other suitable means for the purpose can be employed.

The construction of the apparatus above described is preferred in installations where the vertical space for the casing is limited and there is adequate horizontal space. If the horizontal space instead of the vertical space for the casing is limited, the apparatus is preferably constructed as shown in Figs. 4 and 5, in which the chamber or casing A' is divided into two compartments by an upright partition I having an offset or inclined intermediate portion, and the baffles or bars C' are arranged in two groups, one located in the wide upper portion of one compartment and the other in the wide lower portion of the other compartment. By thus grouping the baffles the resistance to the passage of the air or gas is less than it would be with the same number of baffles or bars arranged in a single group of greater height in a casing of the same dimensions. The eleminator shown in this construction consists of a group of horizontal V-shaped bars or troughs K arranged below each group of baffles or bars C'. These eliminator bars terminate short of the sides of the casing, as shown in Fig. 4, to allow the escape of the water from the bars at their opposite ends. The relative arrangement and spacing of the baffles or bars C' in each group in this construction is substantially the same as in the construction first described.

I claim as my invention:

In an air and gas washing apparatus, the combination of a chamber, a group of a large number of relatively long narrow baffles having substantially flat tops and depending side flanges, said baffles being arranged substantially horizontally in substantially horizontal rows in said chamber with spaces between the baffles, there being a considerable number of baffles in each of a plurality of successive rows, said baffles being wider than the spaces between the baffles in each row and arranged with the baffles in one row opposite the spaces between the baffles in the next row, the end baffles in at least some of the rows being arranged close to the walls of the chamber at each side thereof, means for distributing liquid over the upper portion of said group of baffles, and means for causing the air or gas to flow downwardly through said group of baffles whereby the air entering the chamber is broken up into a multiplicity of small currents and caused to repeatedly cross the path of the water flowing over said baffles, substantially as set forth.

Witness my hand, this 10th day of January, 1910.

WILLIS H. CARRIER.

Witnesses:
 WM. L. FOX,
 C. A. BOOTH.